A. Walker,
Furniture Caster.
Nº 45,773.      Patented Jan. 3, 1865.
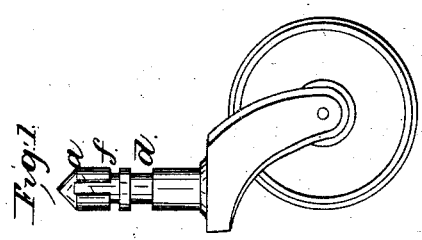
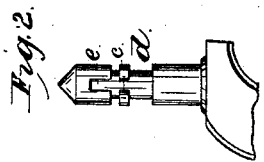
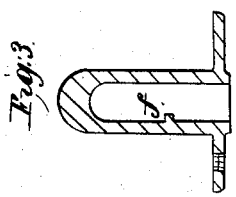
Witnesses:
Henry D. White
James Walker
Inventor,
Alfred Walker

UNITED STATES PATENT OFFICE.

ALFRED WALKER, OF NEW HAVEN, CONNECTICUT.

IMPROVED CASTER FOR FURNITURE.

Specification forming part of Letters Patent No. 45,773, dated January 3, 1865.

*To all whom it may concern:*

Be it known that I, ALFRED WALKER, of the city and county of New Haven, in the State of Connecticut, have invented a new and Improved Method of Making Separable Casters; and I do hereby declare that the following is a full and exact description of the same, reference being had to the accompanying drawings and to the letters of reference marked thereon, all which are hereby made part of these specifications.

The peculiarity of my caster consists in a system of parallel grooves around and upon the pintle (or they may be within the socket) which are traversed by a pin projecting from the corresponding part. The grooves are so arranged that the caster is not liable to drop out of the socket, while it can be taken out and put in instantly.

The number and arrangement of the grooves may vary, but the description of those which I have adopted in practice is as follows: To apply the caster the pintle enters the mouth of the socket, Fig. 3, and encounters the pin $f$, which projects inward through the side of the socket. Coming to the groove $a$, Fig. 1, it passes to the groove $b$, then, by half of a revolution, it comes to the groove $c$, Fig. 2, through which it passes to groove $d$, Figs. 1 and 2. The point of the pintle has now reached the top of its socket and the caster has come to its proper position to sustain the weight of the furniture and perform its appropriate office, the pin meantime traversing the groove $a$, which is made sufficiently wide to prevent the pin from taking the weight when the top of the pintle wears down.

It is not essential that the groove $b$ should encircle the pintle. It may be made by half a circle to connect grooves $a$ and $c$.

When the furniture is raised from the floor, separable casters are tried in their most vulnerable point—namely, that of dropping out—but it will be seen that in this trial my caster must ordinarily remain in its place; but if the pin should happen to be exactly under the groove $c$, the caster in falling would be arrested by the pin entering into its rest $e$, Fig. 2, where it would remain until by placing the furniture upon the floor it would readjust itself. The rest $e$ is important, but not indispensable.

I do not claim to have originated separable casters, nor the pointed pintle to sustain the weight, nor the use of a single groove around the pintle and a pin to traverse the groove, by which a caster is kept permanently in the socket so that it cannot be removed; but

What I claim, and desire to secure by Letters Patent, is—

A combination of vertical and horizontal grooves, with or without the rest $e$, with a pin to traverse the same, substantially as is herein described.

ALFRED WALKER.

Witnesses:
 HENRY. D. WHITE,
 JAMES WALKER.